Patented July 25, 1950

2,516,168

UNITED STATES PATENT OFFICE 2,516,168

ARYL AND ALKYL ALKENYL-PHOSPHONATES

Willard H. Woodstock, Crete, Ill., assignor to Victor Chemical Works, a corporation of Illinois No Drawing. Application October 17, 1947, Serial No. 780,591

8 Claims. (Cl. 260—461)

This invention relates to aryl and alkyl alkenyl-phosphonates in which the aryl and alkyl groups each contain from 4 to 8 carbon atoms and the entire compound contains a total of more than 14, but not more than 24 carbon atoms. In the case of aryl groups, there will, of course, be from 6 to 8 carbon atoms.

The method of producing such compositions is disclosed in my copending application Serial No. 590,956, filed April 28, 1945, now Patent No. 2,471,472. This application is a continuation-in-part thereof. This application is also a continuation-in-part of my copending application Serial No. 643,772, filed January 26, 1946, Patent No. 2,497,920, patented February 21, 1950. The latter application is itself a continuation-in-part of the first application.

While the method of making the phosphonate is described in detail in application Serial No. 590,956, the esters are produced by first forming an addition product of an olefine and $PCl_5$, and reacting that compound with $P_2O_5$ to produce a phosphorus oxydichloride which is then esterified. For example, dioctyl styryl-1-phosphonate ester may be prepared by first forming styryl-1-phosphorus oxydichloride and reacting it with an excess of anhydrous 2-ethylhexanol (octyl alcohol) at a temperature below 30° C.

The following examples illustrate typical procedures for preparing other alkenylphosphonates of this invention. These alkenylphosphonates have plasticizing properties especially when used with vinyl chloride polymers, nitrocellulose, ethylcellulose and cellulose acetate.

Example I

The dioctyl styryl-1-phosphonate ester was prepared by adding one gram mole of styryl-1-phosphorus oxydichloride (from Example 1 of application No. 590,956) to an excess of anhydrous 2-ethylhexanol (octyl alcohol) at a temperature below 30° C. The mixture was then placed under vacuum and held 1 hour at 30° C., 1 hour at 50° C., and 1 hour at 75° C. The excess alcohol and last traces of hydrogen chloride were removed at a higher temperature. The dioctyl ester was then distilled over a temperature of 235–240° C. (4 mm. pressure) and redistilled for purification. The purified ester was a clear almost colorless liquid having a specific gravity of 0.973, a boiling point of 238–240° C. (3 mm. pressure), and formed a glassy solid at −79° C. This product is an excellent plasticizing agent for vinyl and cellulose ester type resins because of its extremely low volatility and ability to impart low temperature flexibility to the plasticized resins.

Example II

One mole equivalent of the isooctenyl-1-phosphorus oxydichloride (from Example 2 of application No. 590,956) was slowly added to four mole equivalents (100% excess) of octyl alcohol (2-ethylhexanol) which had been cooled to below 30° C. The mixture was placed under vacuum and held for one hour at 30° C., one hour at 50° C. and one hour at 75° C. The excess alcohol was then distilled off at a higher temperature, and finally the crude dioctyl isooctenyl phosphonate ester was distilled, and purified by redistillation at near its boiling point of 214° C. at 4 mm. Hg pressure.

Example III

One mole equivalent of the styryl-1-phosphorus oxydichloride (from Example 1 of application No. 590,956) was added to four mole equivalents (100% excess) of n-butanol at a temperature of less than 30° C. The mixture was then heated under vacuum for 1 hour at 30° C., 1 hour at 50° C., 1 hour at 75° C. and then at a higher temperature to distill off the excess butanol and finally at about 200–205° C. to distill over the di-n-butyl styrylphosphonate ester.

Example IV

The diphenyl ester of styryl-1-phosphonic acid was prepared by reacting styryl-1-phosphorus oxydichloride with sodium phenolate. 20 grams of styryl-1-phosphorus oxydichloride (from Example 1 of application No. 590,956) was dissolved in 50 grams of phenol at 40–60° C. and slowly added to 25 grams sodium phenolate in 150 grams phenol and the mixture stirred. After the reaction was complete the mixture was poured into a solution of 135 grams NaOH in 1200 cc. water. The ester product precipitated out as a granular material weighing 26 grams, which represented a yield of 85%. On recrystallization from methanol the pure diphenyl-1-styryl phosphonate ester product had a true melting point of 109° C.

| Compound | Boiling Point, °C. | Freezing Point, °C. | Evaporation Rate, g/sq. cm. | Water Solubility, g/liter |
|---|---|---|---|---|
| Di-n-butyl styryl-phosphonate | 200-5 (3 mm.) | Glassy at −76° | 0.100 | 0.0196 |
| Di-i-amyl styryl-phosphonate | 200-12 (4 mm.) | Glassy at −73° | 0.005 | 0.0161 |
| Dioctyl styryl-phosphonate | 238-40 (3 mm.) | Glassy at −79° | 0.0011 | 0.0169 |
| Dioctyl 1-butenyl phosphonate | 180-5 (3 mm.) | Semi-solid at −80° | 0.032 | 0.0150 |
| Di-i-amyl 1-octenyl phosphonate | 168-73 (4 mm.) | Very viscous at −80° | 0.037 | 0.0140 |
| Dioctyl 1-octenyl-phosphonate | 214 (4 mm.) | Semi-solid at −80° | 0.0078 | 0.0345 |

Example V

The diphenyl ester of styryl-1-thiophosphonic acid was prepared in substantially the same manner as the diphenyl ester of styryl-1-phosphonic acid, by reacting 20 grams styryl-1-phosphorus sulfodichloride with 30 g. sodium phenolate in 200 g. of phenol. On pouring the reacted mixture into a solution of 135 grams NaOH in 1200 cc. water, a theoretical yield of a crude crystalline product melting at 75–79° C. was obtained. On recrystallizing from 160 cc. of methanol a pure crystalline diphenyl styryl-1-thiophosphonate ester was obtained which had a melting point of 83° C.

Dioctyl styrylphosphonate is a particularly good plasticizer as it has a very low evaporation rate of 0.0011 gram per sq. cm. of surface in 100 hours at 100° C. Any phosphonate ester may be used as a plasticizer so long as it does not have an evaporation rate over 0.10 gram under the conditions given above. The aryl or alkyl alkenylphosphonates that are useful as plasticizers have the following formula:

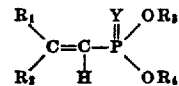

wherein $R_1$ and $R_2$ are a pair of radicals selected from the pairs of radicals consisting of alkyl and alkyl, alkyl and aryl, aryl and aryl, aryl and hydrogen and alkyl and hydrogen, $R_3$ and $R_4$ are each either an alkyl or an aryl radical each containing from 4 to 8 carbon atoms and Y is either oxygen or sulfur. The compound preferably has a total of more than 14, but no more than 24 carbon atoms.

The following table shows some of the properties of some typical compounds within the formula:

The above phosphonates are compatible with ethyl cellulose, nitrocellulose, cellulose acetate, and vinyl chloride polymer resins, and are excellent plasticizers for these resins in amounts from 20% to 40% by weight of the plasticized product, except that the octyl esters are not compatible with cellulose acetate.

The term vinyl chloride polymer as used in the claims is intended to mean a resin containing at least 80% vinyl chloride and from zero to 20% vinyl acetate.

The following table shows plasticizing tests made with the above-named resins prepared by mixing the resins with the plasticizers specified, dissolving them in a suitable solvent and casting them into a thin coating or film and evaporating off the solvent. The films thus produced were strong, clear, and flexible. They showed no tendency toward separation of the plasticizer, and except for the nitrocellulose containing films, all showed improved flame resistance.

| Resin | Plasticizer | Per Cent of Plastic | Solvent | Volatility (5 hrs. at 105° C.) |
|---|---|---|---|---|
| Copolymer of 95% vinyl chloride, 5% vinyl acetate. | Dioctyl styrylphosphonate | 26 | Methyl ethyl ketone | 1% of plasticizer. |
| | Dioctyl 1-octenylphosphonate | 26 | do | 8% of plasticizer. |
| | Dibutyl styrylphosphonate | 26 | do | 13% of plasticizer. |
| | Dioctyl 1-butenylphosphonate | 26 | do | 39% of plasticizer. |
| | Dibutyl 1-butenylphosphonate | 26 | do | 45% of plasticizer. |
| | Dibutyl 1-octenylphosphonate | 26 | do | 59% of plasticizer. |
| | Dioctyl styrylphosphonate | 26 | Methyl ethyl ketone, Butyl acetate, Ethyl alcohol, Toluol.[1] | 1% of plasticizer. |
| Nitrocellulose | Dibutyl styrylphosphonate | 26 | do | 11% of plasticizer. |
| | Dioctyl 1-octenylphosphonate | 26 | do | 12% of plasticizer. |
| | Dibutyl 1-butenylphosphonate | 26 | do | 38% of plasticizer. |
| | Dioctyl 1-butenylphosphonate | 26 | do | 38% of plasticizer. |
| | Dibutyl 1-octenylphosphonate | 26 | do | 50% of plasticizer. |
| | Dioctyl styrylphosphonate | 20 | Toluol and ethyl alcohol.[2] | 4% of plasticizer. |
| Ethyl cellulose | Dioctyl 1-octenylphosphonate | 20 | do | 16% of plasticizer. |
| | Dibutyl styrylphosphonate | 20 | do | 18% of plasticizer. |
| | Dibutyl 1-octenylphosphonate | 20 | do | 23% of plasticizer. |
| | Dibutyl 1-butenylphosphonate | 20 | do | 30% of plasticizer. |
| | Dioctyl 1-butenylphosphonate | 20 | do | 31% of plasticizer. |
| Cellulose acetate | Dibutyl styrylphosphonate | 43 | Acetone | 17% of plasticizer. |
| | Dibutyl 1-butenylphosphonate | 43 | do | 45% of plasticizer. |
| | Dibutyl 1-octenylphosphonate | 43 | do | 51% of plasticizer. |
| | Octyl esters | | Not compatible | |

[1] Mixed solvent: 20% methyl ethyl ketone, 20% butyl acetate, 30% ethyl alcohol, and 30% toluol (by weight).
[2] Mixed solvent: 80% toluol and 20% ethyl alcohol (by weight).

While some of the volatility figures given in the above table appear high, it does not mean that the particular ester is unsatisfactory as a plasticizer. For thick coatings and cast plastic articles the volatility of the plasticizer is of considerably less importance than it is in the thin film. Furthermore, the volatility test is intended as a highly accelerated aging indication, and at normal temperatures the plasticizing esters shown above show little or no tendency to vaporize and are highly satisfactory in most commercial plastic applications.

The following table shows additional tests upon certain of the phosphonates:

| Plasticizer | Per cent by Weight | Resin | Per cent by Weight | Per cent Elongation | | | Per cent loss in 10 days from .004 in. film | | | Heat Stability, Hr. at 160° C. | Flex. Temp., °C. | Sweat-out |
|---|---|---|---|---|---|---|---|---|---|---|---|---|
| | | | | 10° C. | 25° C. | 40° C. | Air 60° C. | Water 25° C. | Oil 25° C. | | | |
| Dioctyl styrylphosphonate | 30 | vinyl chloride polymer.[1] | 70 | 45 | 70 | 125 | 0.1 | −0.9 | 6.7 | 3 | −20.0 | No. |
| | 35 | | 65 | 60 | 110 | 170 | 0.2 | −0.4 | 12.0 | 3 | −32.0 | No. |
| | 40 | | 60 | 90 | 145 | 220 | 0.4 | −0.5 | 16.5 | 3 | −42.0 | No. |
| | 33.5 | | 66.5 | 55 | 100 | 155 | 0.2 | −0.6 | 10.2 | 3 | −28.0 | No. |
| Dioctyl i-butenyl-phosphonate | 30 | do | 70 | 65 | 110 | 175 | 9.0 | 1.6 | 15.5 | 5 | −42.0 | No. |
| | 35 | | 65 | 95 | 150 | 220 | 7.7 | 1.8 | 20.6 | 4 | −53.0 | No. |
| | 40 | | 60 | 140 | 205 | 300 | 8.1 | 1.7 | 26.3 | 4 | −62.0 | No. |
| | 28.5 | | 71.5 | 58 | 100 | 167 | 8.3 | 1.6 | 14.0 | 4 | −38.0 | No. |
| Dioctyl i-octenyl-phosphonate | 30 | do | 70 | 30 | 60 | 115 | 2.3 | 0.1 | 16.7 | 5 | −38.0 | No. |
| | 35 | | 65 | 60 | 95 | 175 | 1.6 | 0.1 | 22.4 | 4 | −36.0 | No. |
| | 40 | | 60 | 100 | 155 | 235 | 1.5 | 0.1 | 28.7 | 4 | −43.0 | No. |
| | 35.5 | | 64.5 | 63 | 100 | 180 | 1.6 | 0.1 | 22.6 | 4 | −53.0 | No. |
| | | | | | | | | | | | −44.0 | No. |

Test procedures are described in Ind. Eng. Chem. 35, p. 896 (1943).
[1] Vinyl chloride polymer=copolymer 95% vinyl chloride and 5% vinyl acetate.

The foregoing detailed description has been given for clearness of understanding only, and no unnecessary limitations should be understood therefrom.

I claim:

1. A plasticizing ester compound having the following structural formula:

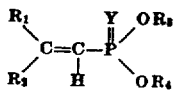

wherein $R_1$ and $R_2$ are a pair of radicals selected from pairs of radicals consisting of: alkyl and alkyl, alkyl and aryl aryl and aryl, aryl and hydrogen, and alkyl and hydrogen, $R_3$ and $R_4$ are each a member of the class consisting of alkyl and aryl radicals each containing from 4 to 8 carbon atoms, and Y is a member of the class consisting of oxygen and sulfur, said compound having a total of more than 14 but not more than 24 carbon atoms.

2. A compound as set forth in claim 1 in which Y is sulfur.

3. A compound as set forth in claim 1 in which $R_1$ is hydrogen and $R_2$ is a phenyl group.

4. A compound as set forth in claim 1 in which $R_1$ is hydrogen and $R_2$ is an alkyl group containing from 2 to 6 carbon atoms.

5. A compound as set forth in claim 1 in which Y is oxygen.

6. A dioctyl iso-octenyl-1-phosphonate.
7. A di-n-butyl styryl-1-phosphonate.
8. A dioctyl styryl-1-phosphonate.

WILLARD H. WOODSTOCK.

REFERENCES CITED

The following references are of record in the file of this patent:

UNITED STATES PATENTS

| Number | Name | Date |
|---|---|---|
| 2,365,466 | Hamilton | Dec. 19, 1944 |
| 2,389,576 | Kosolapoff | Nov. 20, 1945 |
| 2,425,766 | Toy | Aug. 19, 1947 |
| 2,439,214 | Lindsey | Apr. 6, 1948 |

OTHER REFERENCES

Bergmann et al.: "Ber. deutsch. chem. Ges.," vol. 63 (1930), pp. 1158–1173.

Bergmann et al.: "Ber. deutsch. Chem. Ges.," vol. 64 (1931), pp. 1455–1480.

Bergmann et al.: "Ber. deutsch. Chem. Ges.," vol. 66 (1933), pp. 286–291.

"Chemical Industries," vol. 55 (Oct. 1944), pages 580–581.